United States Patent
Sunayama

(10) Patent No.: US 7,412,592 B2
(45) Date of Patent: Aug. 12, 2008

(54) BRANCH INSTRUCTION CONTROL APPARATUS AND CONTROL METHOD

(75) Inventor: Ryuichi Sunayama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 454 days.

(21) Appl. No.: 10/994,603

(22) Filed: Nov. 23, 2004

(65) Prior Publication Data

US 2006/0026409 A1 Feb. 2, 2006

(30) Foreign Application Priority Data

Jul. 27, 2004 (JP) ............................ 2004-219099

(51) Int. Cl.
*G06F 9/315* (2006.01)
(52) U.S. Cl. ...................... 712/233; 712/217
(58) Field of Classification Search ................ 712/233, 712/217, 239
See application file for complete search history.

(56) References Cited

U.S. PATENT DOCUMENTS

| | | | |
|---|---|---|---|
| 3,718,912 A | | 2/1973 | Hasbrouck et al. |
| 5,136,697 A | * | 8/1992 | Johnson ...................... 712/239 |
| 5,944,812 A | * | 8/1999 | Walker ......................... 712/23 |
| 6,052,776 A | * | 4/2000 | Miki et al. ................... 712/233 |
| 6,243,805 B1 | * | 6/2001 | Mahurin ..................... 712/233 |
| 6,477,640 B1 | * | 11/2002 | Rupley, II et al. ........... 712/239 |
| 6,523,110 B1 | * | 2/2003 | Bright et al. ................. 712/239 |
| 6,789,185 B1 | * | 9/2004 | Gomyo et al. .............. 712/217 |
| 2001/0004756 A1 | | 6/2001 | Inoue |
| 2004/0003214 A1 | | 1/2004 | Sunayama et al. |

FOREIGN PATENT DOCUMENTS

JP 2000-181707 6/2000

OTHER PUBLICATIONS

European Search Report for corresponding application No. 04257346.9 dated Mar. 1, 2005.
Office Action issued in corresponding European Patent Application No. 04257346.9, on Feb. 29, 2008.

* cited by examiner

*Primary Examiner*—Eric Coleman
(74) *Attorney, Agent, or Firm*—Staas & Halsey LLP

(57) ABSTRACT

The branch instruction control apparatus of the present invention is a control apparatus in which a plurality of entries in which data required for the implementation control of the branch instructions is stored in order of decoding successively from the top entry, and said apparatus comprises a mechanism which, when one or more entries are successively released in order of older decoding from the top entry among the entries whose implementation control of the corresponding branch instruction has been completed, moves the contents of the remaining entries in a direction toward the top entry by the number of entries released, and a unit for storing data required for the implementation control of newly decoded branch instructions in one or more empty entries which are near the top entry including the entries which become empty by the movement, in the same cycle as in the movement of the said contents.

10 Claims, 21 Drawing Sheets

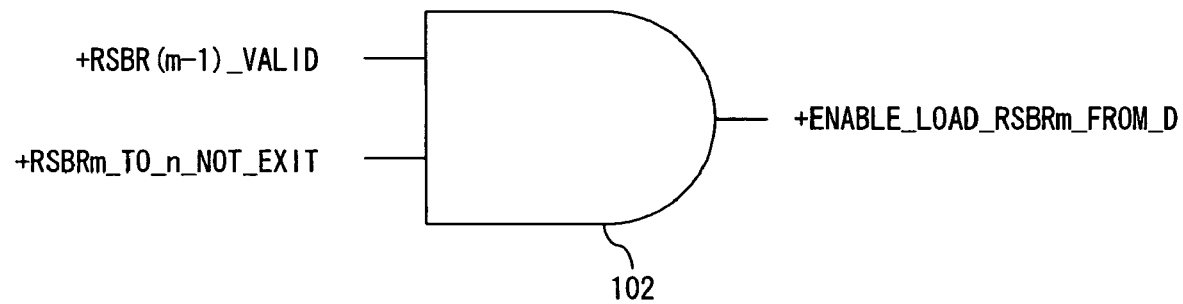
F I G. 4

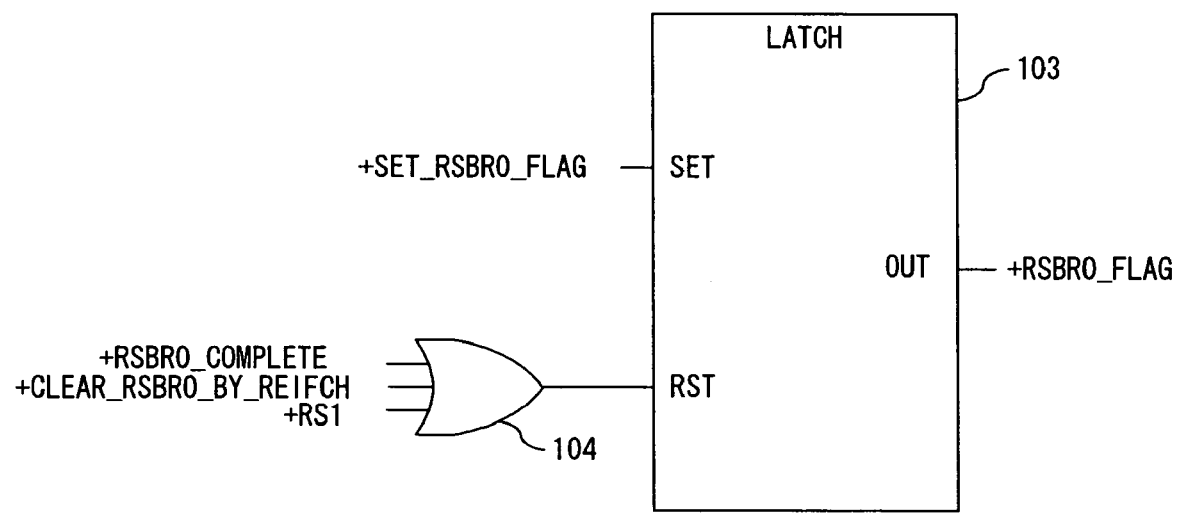
F I G. 5

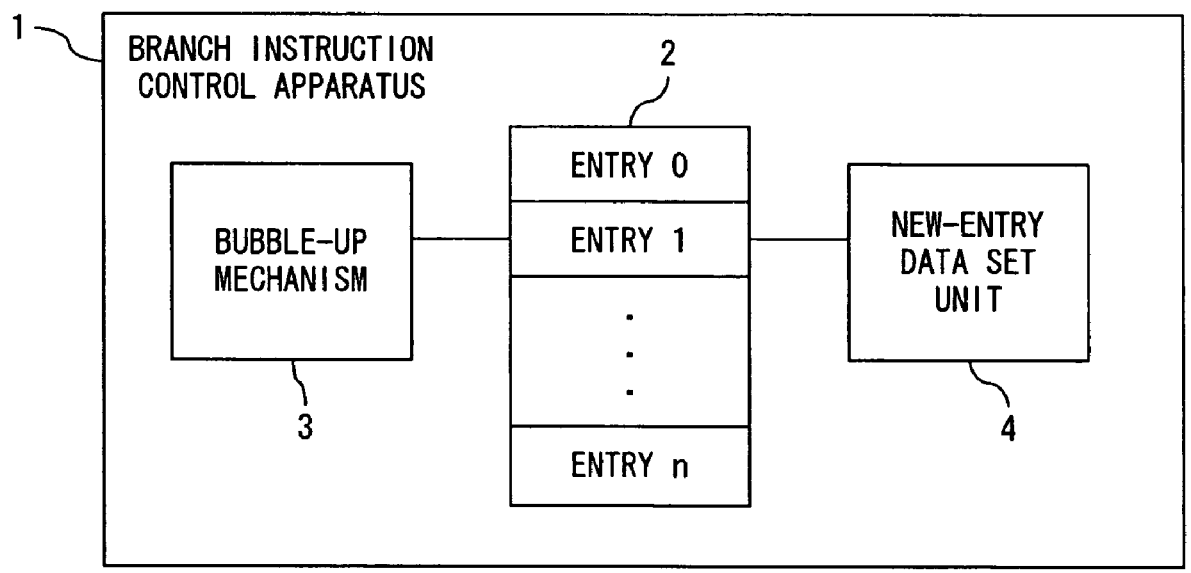
F I G. 6

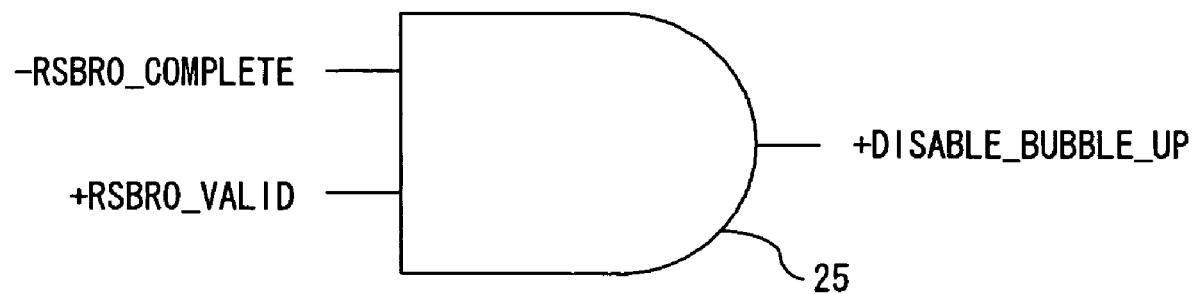
F I G. 9

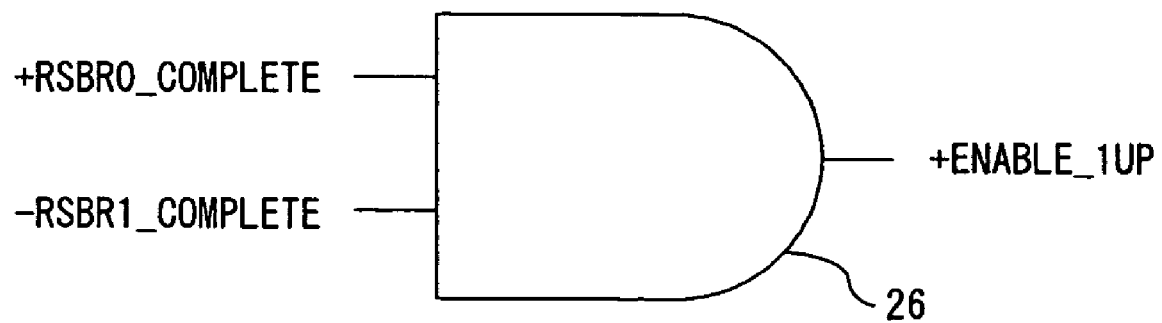
F I G. 1 0

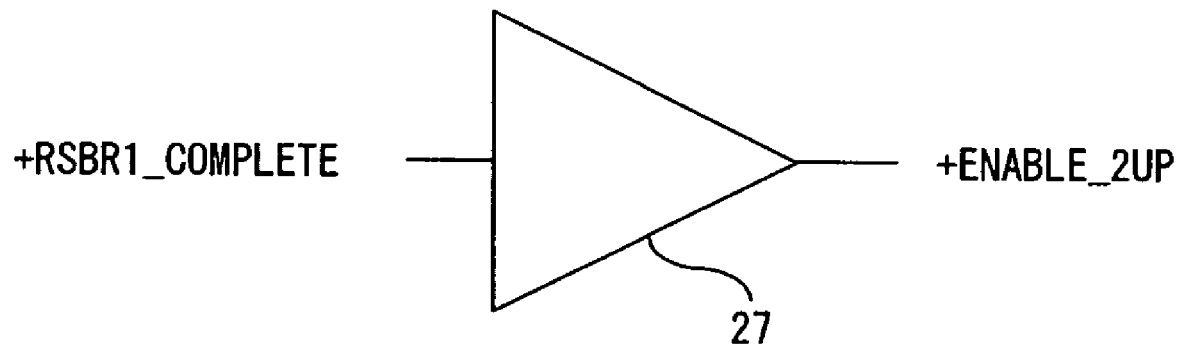
F I G. 1 1

BRANCH INSTRUCTION CONTROL APPARATUS AND CONTROL METHOD

BACKGROUND OF THE INVENTION

1. Field of the Invention

The present invention relates to an instruction control method in a computer system, and more specifically to a branch instruction control apparatus and a control method in which new entries are made and a flag required for the control of a branch instruction is updated in accordance with the release of entries as an entry control method for a branch reservation station for controlling a branch instruction, and entries are rearranged by a bubble-up mechanism, in a computer in which an out-of-order method is adopted.

2. Description of the Related Art

When an instruction is controlled in an instruction control apparatus, an instruction which has been inputted to an implementation pipeline in advance sometimes affects the implementation of succeeding instructions. When the succeeding instructions are implemented based on the implementation results of the preceding instruction, if the processing of the preceding instruction is delayed, no succeeding instructions can be implemented during that time, and the succeeding instructions must keep waiting for the completion of the preceding instruction. In this way, a branch instruction in particular, among instructions which affect the implementation of succeeding instructions, greatly affects the succeeding instructions. When the preceding instruction which has been implemented in advance is an instruction which is going to change branch conditions, unless the implementation results of that instruction are not fixed, it is not possible to judge whether a branch exists or not. If it is not possible to judge whether a branch exists or not, the sequence of the succeeding instructions of the branch instruction cannot be established.

As a result, the succeeding instructions cannot be inputted to the implementation pipeline, so that the processing within the instruction control apparatus stops temporarily, thus causing the processing capability to be reduced. This also applies to an instruction control apparatus which adopts any other processing method, and is the problem common to any instruction control apparatus. In order to solve this problem, usually, an instruction control apparatus holds a branch prediction mechanism. By predicting a branch, it is possible to input the succeeding instruction sequences of the branch instruction one after another to the implementation pipeline without waiting for the completion of the branch instruction.

In the case of an out-of-order processing method having a branch prediction mechanism, a plurality of branch instructions are inputted to the implementation pipeline based on branch prediction results. The branch instructions which are inputted to the implementation pipeline are controlled in a branch instruction control unit. The branch instruction control unit can control a plurality of branch instructions, but there is an upper limit in the number of branch instructions which can be controlled at a time. If the processing of branch instructions is delayed, the resources of the branch instruction control unit decrease gradually, and when the number of branch instructions which are inputted to the implementation pipeline reach the upper limit of the number of entries which can be processed at the same time, no new instruction can be inputted to the pipeline any more.

In such a case, since the succeeding instruction sequences cannot be inputted to the implementation pipeline even if the prediction in the branch prediction mechanism is correct, the processing capability decreases. In order to solve this problem, it is necessary to improve the throughput of the branch instruction processing in the branch instruction control unit and increase the number of branch instructions which can be controlled by the branch instruction control unit at the same time. However, merely by increasing the number of branch instructions (entries) which can be controlled by the branch instruction control unit at the same time, the throughput of the branch instructions cannot be improved, for example, when a toothless state of entries takes place as described later.

When the instruction control apparatus is controlled by the out-of-order method, all the instructions are controlled by the instruction control unit called a reservation station. A plurality of reservation stations exist in the instruction control unit, and by which reservation station an instruction is controlled is determined depending on the kind of the instruction. A pointer method or a bubble-up method is a general method for controlling entries of a reservation station. When entries are controlled by the pointer method, it is possible to effectively use the number of entries which are limited resources without waste, but there is a demerit in that the pointer method cannot easily cope with the tendency of high frequencies used in instruction control apparatuses in recent years.

Each entry of the reservation station is controlled by a VALID signal indicating that the entry is valid or invalid. When entries are controlled by the bubble-up method, unless the VALID signal is 0 (zero) and the entries are invalid, succeeding instructions could not use the entries in prior art. Consequently, until the entries are released (reset) and the succeeding instructions can come to use the entries, the entries are toothless temporarily, and useless cycles in which part of entries cannot be used are generated.

When an branch instruction is controlled by a reservation station, entries must be released in order. Therefore, the entries in the reservation station must always line up in the order of instructions. When the entries of a branch reservation station are controlled by the bubble-up method, if the entries become toothless temporarily after the entries are released and the entries cannot be used effectively, the entries reach the seeming upper limit of the number of entries, so no new instruction can be inputted to the implementation pipeline. Moreover, unless no succeeding instruction can be registered to the branch reservation station although, in fact, there is some space in the entries, the throughput of the branch instruction decreases, thus causing the performance of an instruction control apparatus to be decreased.

The prior art of the branch instruction control method which uses such a branch reservation station that has been described above is explained below using FIG. 1 to FIG. 5. FIG. 1 is an example showing the release of entries in a branch reservation station and the process of making a new entry in accordance with the input of a new instruction in prior art.

A total of ten entries, for example, from RSBR0 to RSBR9 are provided in the branch reservation station. In a first cycle, data or flags required for the control of branch instruction 1 to branch instruction 6 are stored for six entries from RSBR0 to RSBR5; branch instruction 7 and branch instruction 8 are going to be inputted to RSBR6 and RSBR7 respectively from the side of the decoder; and the control is going to be completed for branch instruction 1 to branch instruction 3.

In the following cycle, three entries from RSBR0 to RSBR2 in which flags, etc. for three branch instructions whose implementation control has been completed are stored are released; flags, etc. for branch instruction 7 and branch instruction 8 are stored for RSBR6 and RSBR8; and new entries are going to be made in RSBR8 and RSBR9 for branch instruction 9 and branch instruction 10 which are inputted from the side of the decoder.

In the following cycle, bubbling-up is carried out, and the contents of each entry are moved in a direction toward the top entry. In prior art, this bubbling-up is carried out after the entry positioned in a direction toward the top entry is released and the VALID flag for the released entry is lowered. Consequently, the bubbling-up is carried out after it is confirmed that the entries from RSBR0 to RSBR2 have been released and the VALID flag has been lowered.

In the bubbling-up here, it is supposed that the contents of an entry are moved in a direction toward the top entry by the number of one entry for each of the entries. The flags, etc. for branch instructions from branch instruction 4 to branch instruction 8 are stored in the entries from RSBR2 to RSBR6. Then, data for branch instruction 9 and branch instruction 10 which were going to be newly inputted to RSBR8 and RSBR9 in the preceding cycle is stored, that is to say, new entries are made.

As a result, RSBR0, RSBR1 and RSBR7 out of ten entries are empty, that is to say, toothless. So, when trying to input new branch instructions from the side of the decoder in this cycle, there is no empty entry on the rear end side of the branch reservation station, and no new branch instruction can be inputted in the implementation pipeline.

FIG. 2 to FIG. 5 show part of the control circuit corresponding to a conventional technology of FIG. 1. In order to compare the conventional control circuits shown in these figures with the control circuits of the present invention which will be explained later, described below is the operation of these control circuits (shown in FIG. 2 to FIG. 5).

FIG. 2 shows a bubble-up control signal output circuit (No. 1). In the prior art shown in FIG. 1, all the entries from RSBR0 which is the top entry to RSBRm which is the (m+1) th entry exist in the branch reservation station. In other words, when flags, etc. are stored, a disabled bubble-up signal indicating bubble-up inability is outputted from the buffer 100. In the prior art shown in FIG. 1, bubbling-up is carried out in the form in which the contents of an entry are moved in a direction toward the top entry by the number of one entry for each of the entries, so bubbling-up is impossible when data is stored continuously in all the entries from the top entry to the (m+1)th entry.

FIG. 3 shows a bubble-up control signal output circuit (No. 2). In FIG. 3, when all the entries from RSBR0 to RSBRm does not exist, that is to say, when data is not stored in all the entries, that is to say, when there is even a single empty entry on the way, an enable_1up signal indicating that the bubbling-up of the entry following the empty entry is possible is outputted from the buffer 101.

FIG. 4 shows the output circuit of a load permitting (enabling) signal for data for RSBRm from the decoder. In FIG. 4, when a VALID signal indicating that RSBR (m−1) is valid for the AND gate 102, and a signal indicating that entries from RSBRm to RSBRn which is the last entry do not exist, that is to say, these entries are empty are inputted, loading of data such as a flag in the entry RSBRm is permitted from the decoder.

FIG. 5 shows the latch circuit holding data such as a flag required for the control of branch instructions as the entry of the branch reservation station. FIG. 5 corresponds to the RSBR0 of the top entry, and in the prior art shown in FIG. 1, the same type latch circuit as shown in FIG. 5 is used in correspondence with the three entries from the top entry to RSBR2.

In FIG. 5, a set signal which sets data such as a flag to the entry of RSBR0 is given to the set terminal. When a COMPLETE signal indicating that the branch instruction for the entry of RSBR0 via the OR gate 104 has been completed, a CLEAR signal which releases the entry of RSBR0 when re-instruction fetching is required as will be described later, and RS1 as a RESET signal used for interrupt, etc. are inputted to a reset terminal, and when these signals become H (1), a reset is executed. The COMPLETE signal of RSBR0 resets the contents of the latch 103, but basically, it is used to lower the VALID flag in order to carry out bubbling-up as described above.

In the configuration of the latch circuit for seven entries from RSBR3 to RSBR9, the difference lies only in that only a COMPLETE signal as the entry of the OR gate 104 is excluded. This is because in prior art of FIG. 1, when the control of branch instructions is completed, the entries which are released are limited to three entries from RSBR0 to RSBR2, and entries which are released at the same time are limited to one or more entries which can be released continuously from the top entry.

The following document is available as the prior art concerning the out-of-order instruction control method.

Patent document 1: Kokai (Jpn. unexamined patent publication) No. 2000-181707 "Instruction Control Apparatus and Method"

In this document, an instruction control apparatus is disclosed in which a reservation station in which a plurality of instructions which have been decoded and which have not been issued to the implementation unit are stored temporarily is provided, and in which information stored in entries is moved by the bubble-up method for the reservation station. However, even in this technology, the problem was not solved in that entries become toothless with the operation method in which bubbling-up is carried out after the VALID flags of the entries which have been released are lowered as described in FIG. 1.

SUMMARY OF THE INVENTION

In view of the above-mentioned problems, the present invention has been developed to improve the throughput of branch instructions and prevent the performance of the instruction control apparatus from decreasing by preventing a temporary toothless state after entries are released when the entries of branch reservation stations are controlled by the bubble-up method.

The branch instruction control apparatus of the present invention is a control apparatus in which a plurality of entries in which data required for the implementation control of the branch instructions is stored in order of decoding successively from the top entry are provided, and said apparatus comprises a mechanism which, when one or more entries are successively released in order of older decoding from the top entry among the entries whose implementation control of the corresponding branch instruction has been completed, moves the contents of the remaining entries in a direction toward the top entry by the number of entries released, and a unit for storing data required for the implementation control of new branch instructions in one or more empty entries which are near the top entry including the entries which become empty by the movement, in the same cycle as in the movement of the said contents.

BRIEF DESCRIPTION OF THE DRAWINGS

FIG. 4 is an example showing the data load enable signal output circuit for entries in prior art.

FIG. 5 is an example showing the latch circuit in an entry in prior art.

FIG. 6 is a block diagram showing the configuration of the principle of the branch instruction control apparatus of the present invention.

FIG. 9 shows the BUBBLE-UP control signal output circuit (No. 1).

FIG. 10 shows the BUBBLE-UP control signal output circuit (No. 2).

FIG. 11 shows the BUBBLE-UP control signal output circuit (No. 3).

DESCRIPTION OF THE PREFERRED EMBODIMENTS

Figure 1:
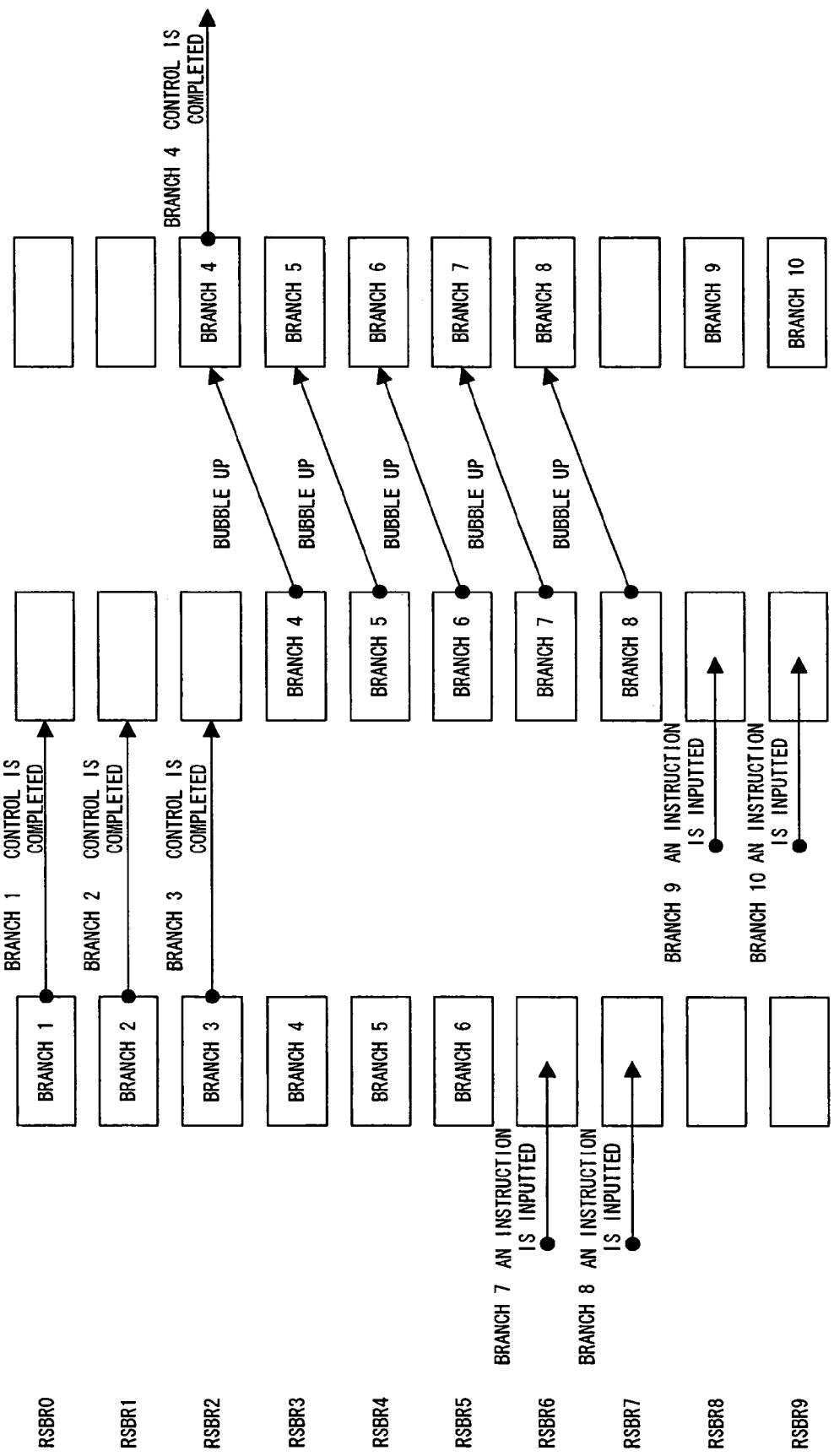
FIG. 1 is an example showing the entry release and bubble-up operation in prior art.

FIG. 6 is a block diagram showing the configuration of the principle of the branch instruction control apparatus of the present invention. FIG. 6 is a block diagram showing the configuration of the principle of the branch instruction control apparatus 1 which includes a plurality of entries 2 in which data required for the implementation control of branch instructions is stored in order of the decoding of the branch instructions successively from the top entry in accordance with each branch instruction, and the apparatus 1 comprises a bubble-up mechanism 3 and a new-entry data set unit 4.

The bubble-up mechanism 3 is the mechanism which, when one or more entries are successively released in order of older decoding from the top entry among the entries whose implementation control of the branch instructions has been completed, moves the contents of the remaining entries in a direction toward the top entry by the number of entries released, and the new-entry data set unit 4 sets data required for the implementation control of newly decoded branch instructions in one or more empty entries which are near the top entry including the entries which become empty by the movement, in the same cycle as the movement of the said contents.

In an embodiment of the present invention, the number of entries released and the number of new entries in which data is newly set can be made equal, and it is possible to further include an entry data update unit (for example, a RSBR update circuit) for updating data required for the implementation control of branch instructions stored in each entry in the same cycle as the movement of the contents of entries by the bubble-up mechanism 3.

In another embodiment, it is also possible to further include an entry release unit (used when re-instructions are fetched) which, when the branch prediction concerning the branch instructions corresponding to the entries in which data required for the implementation control of branch instructions is stored ends in failure and re-instructions are fetched in the same cycle as in the movement of the contents of entries by the bubble-up mechanism 3, releases the entries corresponding to new branch instructions in which the order of decoding is newer than that of the branch instructions including the entries before being bubbled-up which correspond to the branch instructions.

The branch instruction control method of the present invention is a method which controls branch instructions using a plurality of entries in which data required for the implementation control of the branch instructions is stored in the order of decoding of the branch instructions successively from the top entry in accordance with the branch instructions, and the method which, when one or more entries are successively released in the order of older decoding from the top entry among the entries whose implementation control of the corresponding branch instruction has been completed, the bubble-up mechanism moves the contents of the remaining entries in a direction toward the top entry by the number of entries released, and sets data required for the implementation control of the branch instructions which are newly decoded to one or more empty entries which are near the top entry including the entries which become empty by the movement, in the same cycle as the movement of said contents.

According to the present invention, at the same time when the entries of the reservation stations are released, the entries which are waiting for implementation can be rearranged by the bubble-up mechanism; new entries corresponding to new branch instructions can be made; flags required for the branch instruction control can be updated; the throughput of instruction processing control equivalent to the entry control by the pointer method can be realized; and can easily cope with the change of the frequency of the instruction control apparatus into high frequency, thus contributing greatly to increasing the performance of the information processing system.

Figure 7:
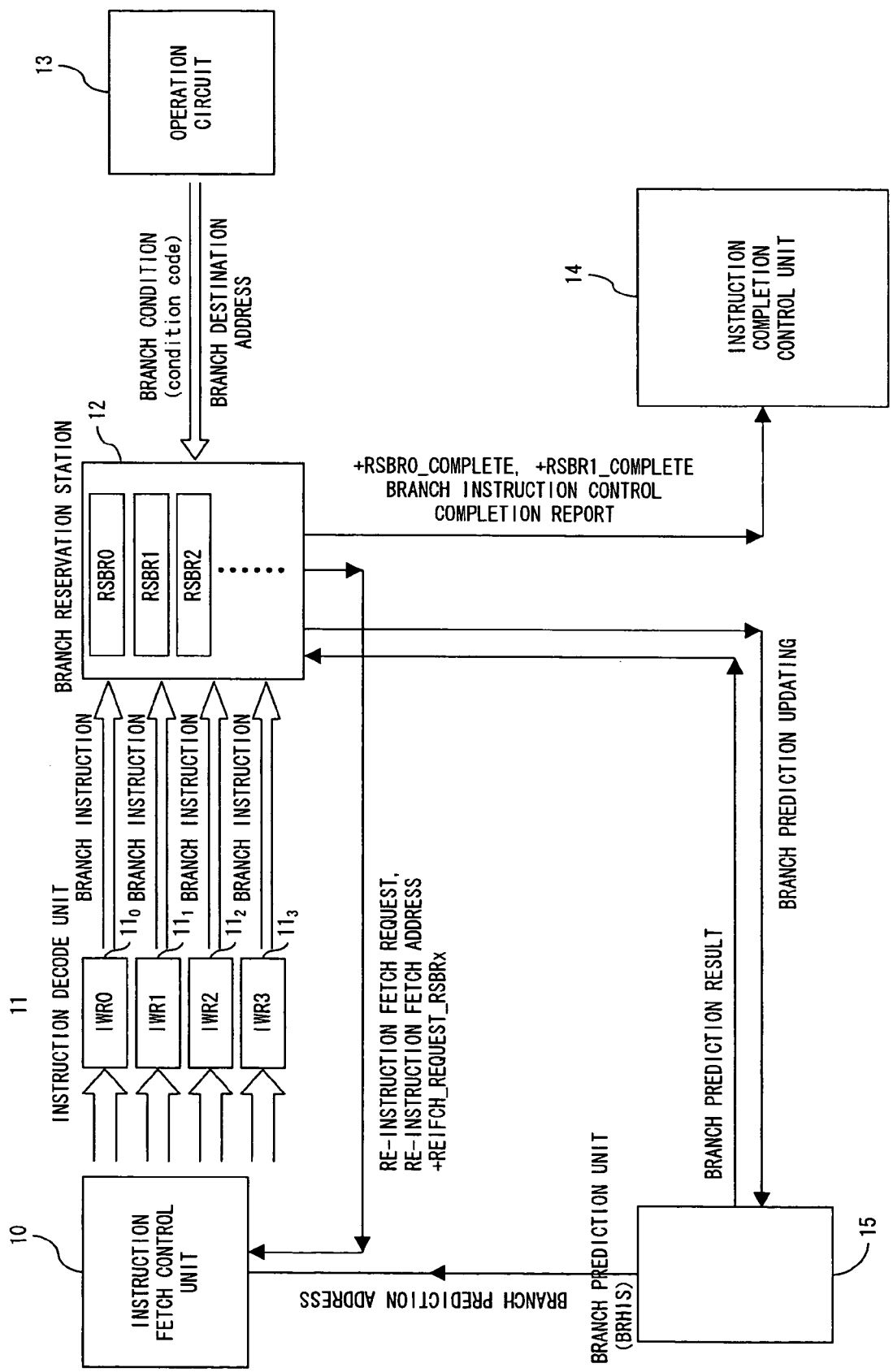
FIG. 7 is a block diagram showing the configuration of the information processing device in which the branch instruction control apparatus of the present invention is used.

FIG. 7 is a block diagram showing the whole configuration of the information processing device in which the branch instruction control apparatus of the present invention, for example, the branch reservation station, is used. In FIG. 7, the information processing device comprises an instruction fetch control unit 10, an instruction decode unit 11, a branch reservation station 12, an operation circuit 13, an instruction completion control unit 14, and a branch prediction unit 15, to process instructions in out-of-order.

When an instruction is fetched by the instruction fetch control unit 10, a branch prediction is conducted by the branch prediction unit (branch history) 15 based on a instruction fetch address, and when the instruction is predicted to branch, a branch prediction address is given to the instruction fetch control unit 10. Then, the instruction and the prediction result are inputted to the instruction decode unit 11, and when the instruction is decoded, the instruction is judged to be a branch instruction or an instruction which is predicted to branch, and is inputted to the branch reservation station (reservation station for branch, RSBR) 12, and at the same time, is also given to the instruction completion control unit 14 to which all the instructions are given. The RSBR is supposed to include everything, namely a plurality of entries in which data and flags required for the control of branch instruction are stored, a control circuit which carries out various controls such as storing, updating and bubbling-up of data for each entry, etc.

From the operation circuit 13, a condition code as a branch condition and a branch destination address are given to the branch reservation station 12, and from the branch prediction unit 15, a branch prediction result is given to the branch reservation station 12. From the branch reservation station 12, a branch instruction completion report indicating that the control of branch instructions has been completed, or a COMPLETE signal is given to the branch completion control unit 14, and branch prediction update data is given to the branch prediction unit 15 when necessary, and when the branch prediction ends in failure and re-instruction fetching is conducted, the re-instruction fetch request and the re-instruction fetch address are given to the instruction fetch control unit 10.

The branch reservation station 12 has a plurality of entries, RSBR0, RSBR1, RSBR2 . . . to control a plurality of branch instructions at the same time, and when there is any empty entry, a new entry is made in a decoding cycle according to the instructions from the instruction decode unit 11. However, when there is no empty entry, that fact is notified to the branch decode unit 11, and the decoding of all the instructions is stopped. In this embodiment, the branch reservation station 12 can control n+1 entries from RSBR0 to RSBRn, and can make entries which correspond to a maximum of, for example, two instructions at the same time, and can release entries which correspond to a maximum of two instructions at the same time.

When entries are made in the RSBR based on the instructions of the instruction decode unit 11, the entries from RSBR0 to RSBR1, RSBR2, RSBR3 . . . are made in order of the issuance of instructions. When the RSBR has already held any effective entry when the entries are made, the following four conditions are judged.
1) An instruction whose control has been completed in the RSBR does not exist in the entries held within the RSBR.
2) An instruction whose control has been completed in the RSBR exists in the entries held within the RSBR.
3) An instruction which has requested re-instruction fetching exists in the entries held within the RSBR.
4) Interrupt has occurred on the implementation pipeline.

Which condition among the above conditions has been satisfied is judged, and whether entries can be made and where to be made are determined. Here, for convenience' sake, effective entries from RSBR0 to RSBR4 are supposed to have existed when the entries are made. If the condition of 1) has been satisfied, entries which are released from the RSBR do not exist, and the entries from RSBR0 to RSBR4 must be continuously controlled within the RSBR. Consequently, new entries are made to RSBR5, or RSBR5 and RSBR6.

If the condition of 2) has been satisfied, entries which are released from the RSBR exist. The fact that entries are released means that the implementation control of the branch instructions responding to the entries has been completed. The RSBR removes the entries whose control has been completed, and continues to control the entries in which the control is continuously required.

The release of RSBR entries is conducted in order, and since entries are always rearranged in order of decoding of instructions by bubbling-up, each entry is arranged in order of an older instruction from RSBR0. When RSBR0 is released from the RSBR, the entry of and after RSBR1 is bubbled up in a direction toward a smaller number by one entry. Since the entry of and after RSBR4 after bubbling-up becomes empty, a new entry is made to RSBR4, or RSBR4 and RSBR5.

If the condition of 3) has been satisfied, since the decoder supplies the instruction sequence which, if fact, cannot be implemented to the pipeline, no new entry is made within the RSBR. However, the instructions prior to the instruction which have been registered and which requests re-instruction fetching are continuously controlled within the RSBR. So, every time an entry is released from the RSBR, bubbling-up is only conducted. If the condition 4) is satisfied, all the entries within the RSBR are deleted. Consequently, no new entry is made.

Bubbling-up is possible by the number of entries released from the RSBR. In this embodiment, a maximum of two entries are released at the same time, and in this case, bubbling-up is conducted by the number of two entries. The RSBR can be released only from RSBR0 and RSBR1. In this embodiment, it is supposed that when bubbling-up is conducted, each entry can independently update the flag (data) which the entry holds. Therefore, the control concerning branch instructions becomes possible even during bubbling-up. The control concerning branch instructions means the judgement of branch, acquisition of a branch-destination address, judgement of branch prediction, and request of re-instruction fetching when the branch prediction fails.

The fact that the control concerning branch instructions is possible even during bubbling-up means that as the result of conducting a branch prediction judgement, for example, in RSBR2, if the branch prediction is supposed to end in failure, the request of re-instruction fetching must be issued from RSBR2 to the instruction fetch control unit 10. At that time, RSBR0 is supposed to have satisfied the release condition (COMPLETE condition) from the RSBR in the same cycle. The branch instruction of RSBR2 must stay in RSBR1 in the next cycle as the bubble-up condition is satisfied. Therefore, RSBR2, while issuing the request of re-instruction fetching to the instruction fetch control unit 10, sets data and flags to RSBR1, and issues a reset instruction to the entries of and after RSBR2 in order to clear all the branch instructions existing in and after RSBR3 and all the instructions which have been newly decoded. Furthermore, since the request of re-instruction fetching is issued from RSBR2 to RSBR1 during bubbling-up, a flag indicating that the request of re-instruction fetching has been issued is set to RSBR1.

Figure 8:
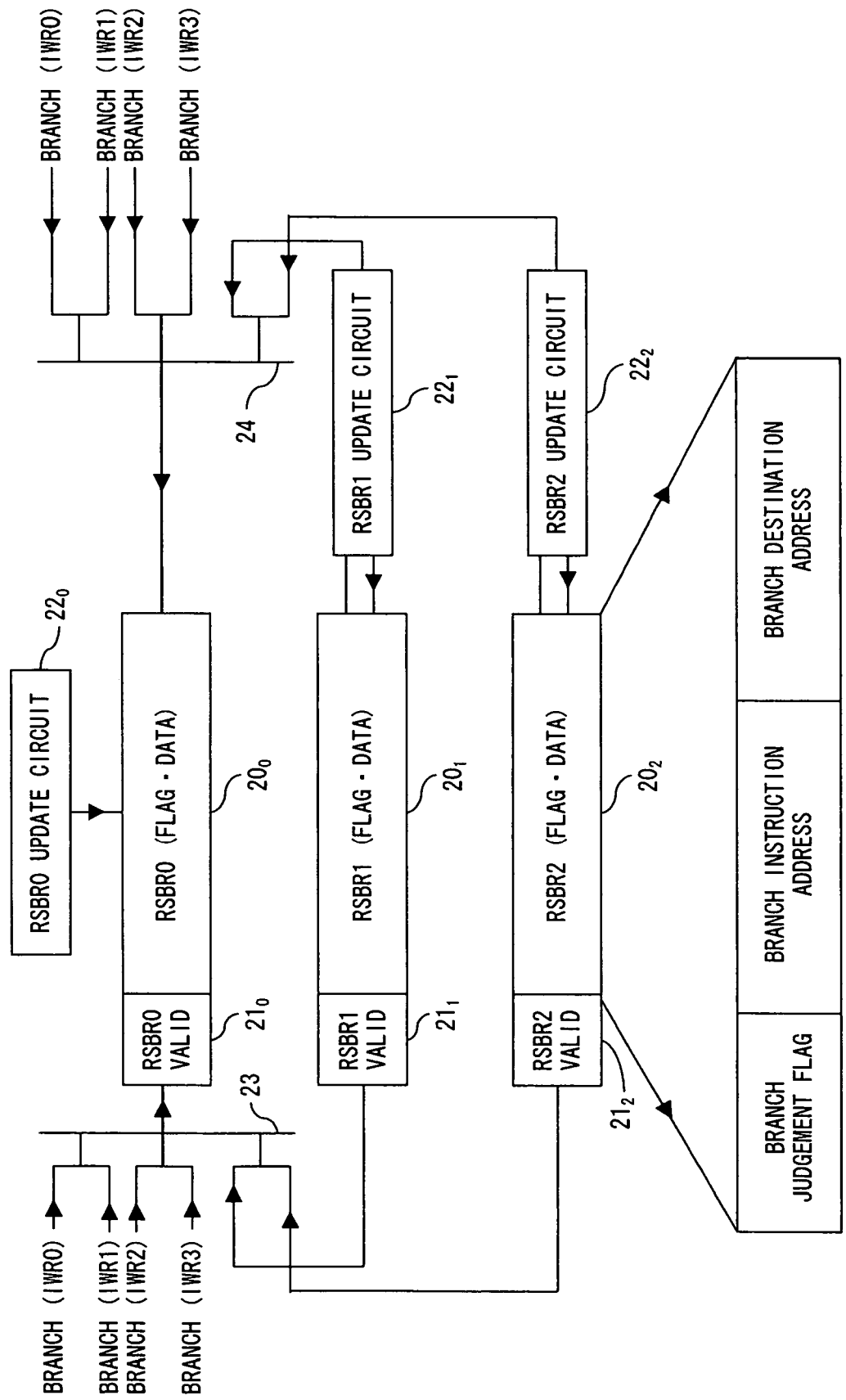
FIG. 8 shows the control circuit for entries in the branch instruction control apparatus.

FIG. 8 shows the control circuit of each entry in the branch reservation station 12. Each entry has a storage region 21 of a VALID flag indicating whether the entry is valid or not and a storage region 20 of the other flags and data. The flags and data stored in the region other then the storage region for the VALID flag are, for example, the branch judgement flag indicating that the branch has been fixed/not fixed, or established/not established, etc., the address of a branch instruction, the address of a branch destination which is given by the operation circuit 13 in FIG. 7, etc.

For each entry, an entry update unit for updating the storage contents of the flags and data for the corresponding entry is provided. For example, a RSBR0 update circuit $22_0$ for updating the storage contents of the flags and data for RSBR0 is connected to entry RSBR0. On the left side of the entries, a selector 23 which selects, for example, data which is inputted from four instruction word registers (IWR) within the instruction decode unit 11 when the instructions are decoded, and the data which is used to move the data of the following entries when entries are bubbled up is provided, and on the right side of the entries, a selector 24 which selects data from the update circuit corresponding to each following entry is provided.

In FIG. 8, only the control circuit for the top entry i.e. RSBR0 is shown, but an equivalent control circuit also exists for RSBR1, RSBR2 . . . . The branch instruction from IWR0 and IWR1 among branch instructions which are given to, for example, the selector 23 is inputted to the selector 23 through one path. This is because there is a low possibility that two successive instructions among the four instructions which are decoded at the same time by the instruction decode unit 11 are both branch instructions.

Figure 2:
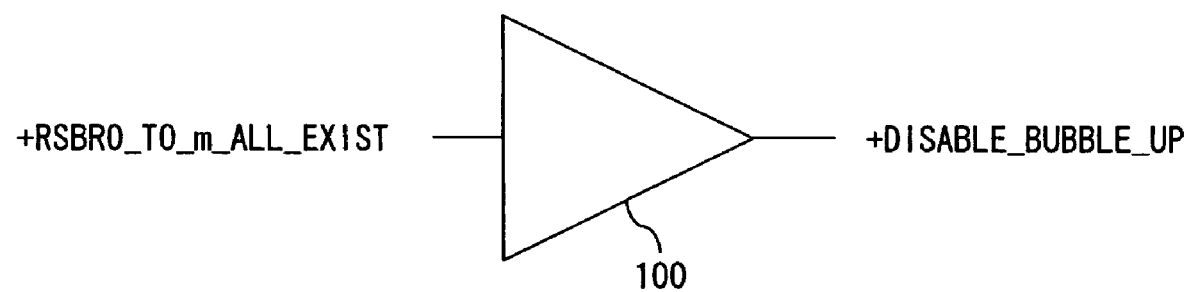
FIG. 2 is an example showing the bubble-up control signal output circuit (No. 1) in prior art.
Figure 3:
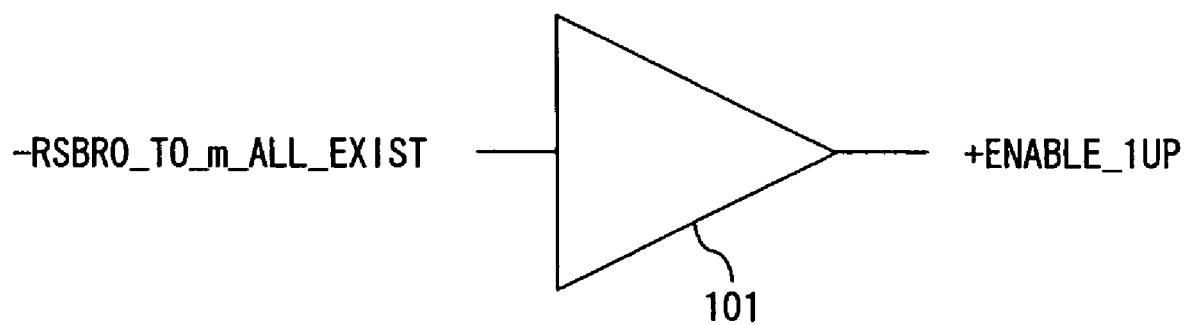
FIG. 3 is an example showing the bubble-up control signal output circuit (No. 2) in prior art.

Described below are details of each control circuit for the branch reservation station in this embodiment. FIG. 9 shows the BUBBLE-UP control signal output circuit (No. 1). FIG. 9 shows the circuit which outputs a bubble-up prohibition signal, i.e. a disable bubble-up signal in the same way as in FIG. 2 in prior art, and this circuit outputs a bubble-up prohibition signal when a COMPLETE signal is L (0) for RSBR0 given to the AND gate 25, and the signal indicting that the entry is VALID is H (1). In other words, when entry RSBR0 is VALID, and the implementation control of the branch instruction corresponding to this entry has not been completed, the top entry cannot be released, and therefore, bubbling-up is prohibited.

FIG. 10 shows the BUBBLE-UP control signal output circuit (No. 2). In FIG. 10, an ENABLE_1 up signal which moves the contents of each entry by the number of one entry in a direction toward the top entry is outputted from the AND gate 26 when the COMPLETE signal indicating that the implementation control of the branch instruction responding to RSBR0 has been completed is H, and the signal indicating that the implementation control of the branch instruction corresponding to the following entry RSBR1 has been completed is L, that is to say, when the implementation control has not been completed.

FIG. 11 shows the BUBBLE-UP control signal output circuit (No. 3). In FIG. 11, the buffer 27 outputs an ENABLE_2 up signal which moves the contents of each entry in a direction toward the top entry by the number of tow entries when the COMPLETE signal indicating that the implementation control of the branch instruction corresponding to RSBR1 has been completed is H. Here, RSBR1 is the second entry from the top entry; to release entries one after another from the top entry is a basic principle in the control of the branch reservation station 12; when RSBR1 may be released, the COMPLETE signal for RSBR0 is also H; and RSBR0 is also released at the same time. Consequently, the bubbling-up which moves the contents of the respective entries in a direction toward the top entry by the number of two entries is conducted.

Any of the bubble-up control signal output circuits shown in FIG. 9, FIG. 10, and FIG. 11 constitutes the mechanism which moves the contents of the remaining entries in a direction toward the top entry by the number of entries released when one or more entries are successively released in the order of older decoding from the top entry among the entries whose implementation control of the corresponding branch instruction has been completed, namely the bubble-up mechanism.

Figure 12:
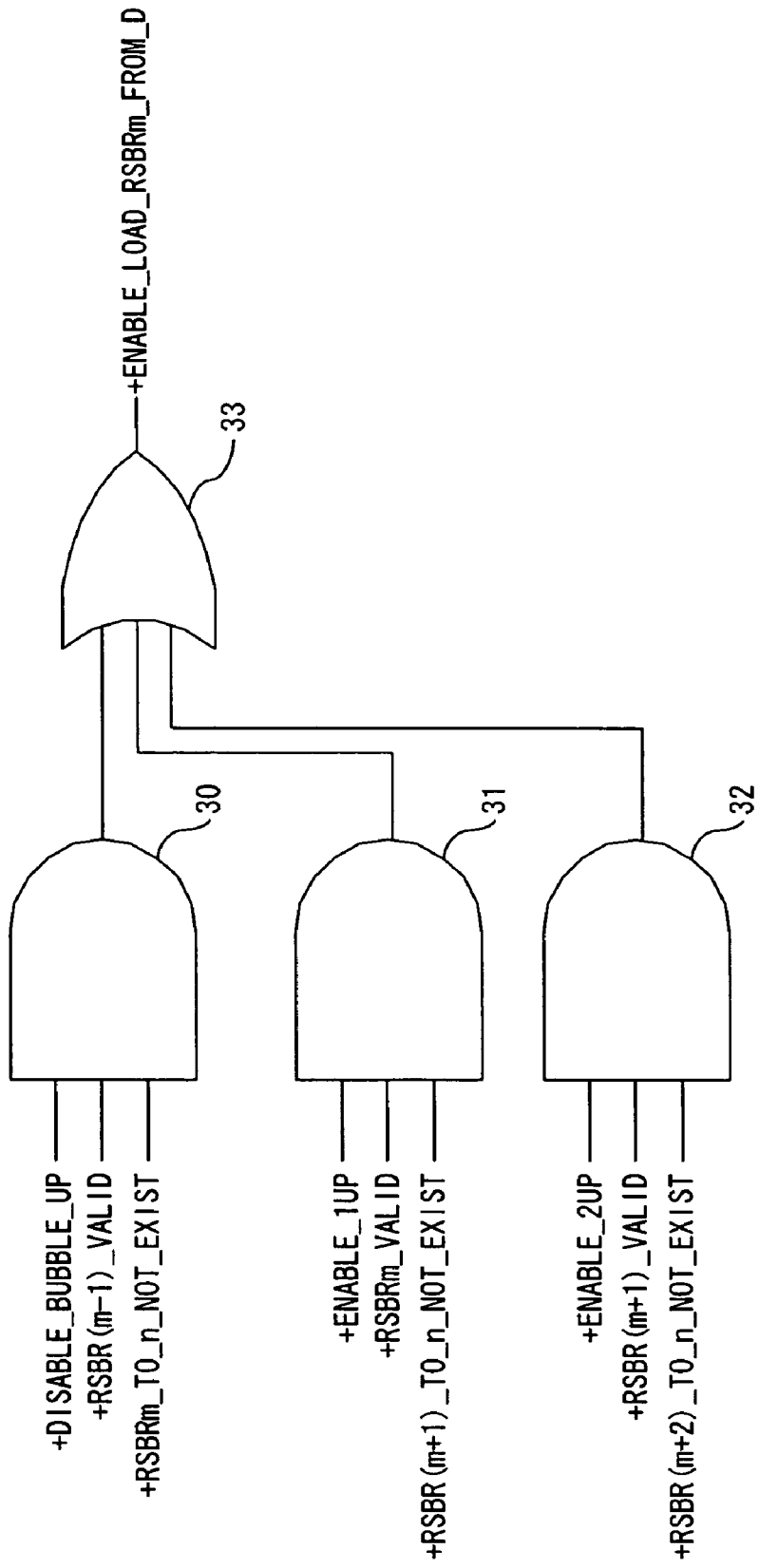
FIG. 12 shows the data LOAD ENABLE signal output circuit for entries.

FIG. 12 shows the ENABLE signal output circuit for data loading from the instruction decode unit 11 for RSBRm. In FIG. 12, the OR gate 33 outputs an ENABLE signal which permits the loading of data for RSBRm from the instruction decode unit 11 when any output of the three AND gates, 30, 31 and 32 becomes H.

The AND gate 30 outputs H to the OR gate 33 when a disable bubble-up signal as the output of the AND gate 25 shown in FIG. 9, a VALID signal indicating that the RSBR (m−1), that is, the immediately prior entry is valid, and a signal indicating that entries from RSBRm to RSBRn (i.e. the last entry) do not exist, that is to say, these entries are empty, are inputted as H respectively. In other words, in this state, bubbling-up is not conducted, and the immediately prior entry RSBR (m−1) is valid, and since the entries from RSBRm to the last entry RSBRn are empty, loading of data from the instruction decode unit 11 is permitted.

When an ENABLE_1 up signal as the output of the AND gate 26 shown in FIG. 10, a VALID signal indicating that RSBRm stores valid data, and a signal indicating that the entries from the RSBR (m+1) which is next to the entry in which data is going to be loaded to the last entry are empty are inputted as H respectively, the AND gate 31 gives the output H to the OR gate 33. In this state, since the bubbling-up in which the contents of each entry is moved in a direction toward the top entry by the number of one entry can be conducted, the data which is loaded from the instruction decode unit 11 is set to RSBRm.

When an ENABLE_2 up signal as the output of the buffer 27 shown in FIG. 11, a signal indicating RSBR (m+1) is valid, and a signal indicating that entries from RSBR (m+2) to the last entry are empty, are inputted as H respectively, the AND gate 32 gives the output H to the OR gate 33. In other words, the bubbling-up in which the contents of each entry is moved in a direction toward the top entry by the number of two entries is conducted, so that the data from the instruction decode unit 11 is set to RSBRm.

Figure 13:
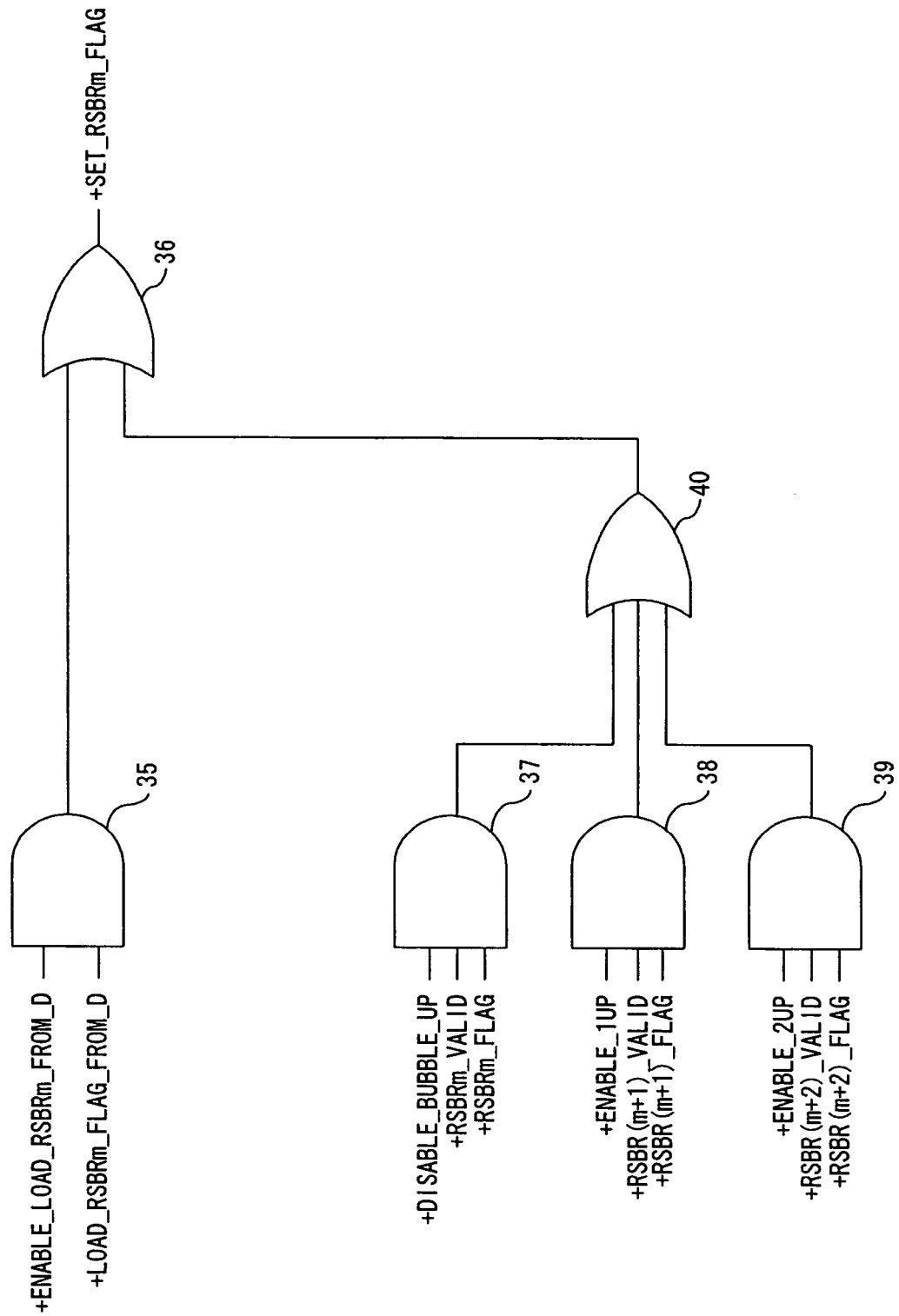
FIG. 13 shows the data SET signal output circuit for entries.

FIG. 13 shows the data/flag SET signal output circuit for RSBRm to set data for the latch circuit (FIG. 14) similar to the latch circuit in prior art shown in FIG. 5. In FIG. 13, when the output of the AND gate 35 or the OR gate 40 is H, the OR gate 36 outputs a data SET signal to the latch circuit.

When the output of the OR gate 33 shown in FIG. 12 and a LOAD signal of the data and flags for the RSBRm actually given from the instruction decode unit 11 are both H, the AND gate 35 gives the output H to the OR gate 36, and as a result, the data is set to the latch circuit.

When the output of any of the three AND gates, 37, 38, and 39 becomes H, the OR gate 40 gives the output H to the OR gate 36. When the output of the AND gate 25 shown in FIG. 9, a VALID signal indicating that RSBRm is valid, and data and flags which should be stored in RSBRm are H respectively, the AND gate 37 outputs H to the OR gate 40. In other words, bubbling-up is not conducted in this state, the contents of RSBRm as they are are written to the same entry as a self loop again.

When the output of the AND gate 26 shown in FIG. 10, a VALID signal for RSBR (m+1), and data such as a flag which should be stored in the entry are inputted as H respectively, the AND gate 38 gives the output H to the OR gate 40. When the output of the buffer 27 shown in FIG. 11, a VALID signal for RSBR (m+2), and data such as a flag are inputted as H respectively, the AND gate 39 gives the output H to the OR gate 40. In other words, the AND gate 38 writes the contents of RSBR (m+1) to RSBRm when bubbling-up is conducted by the number of one entry, and the AND gate 39 writes the contents of RSBR (m+2) to RSBRm when bubbling-up is conducted by the number of two entries. The data SET signal output circuit shown in FIG. 13 together with the data load ENABLE signal output circuit shown in FIG. 12 constitutes the new entry data set unit (corresponding to the AND gate 35) and the bubble-up mechanism, both specified in claim 1.

Figure 14:
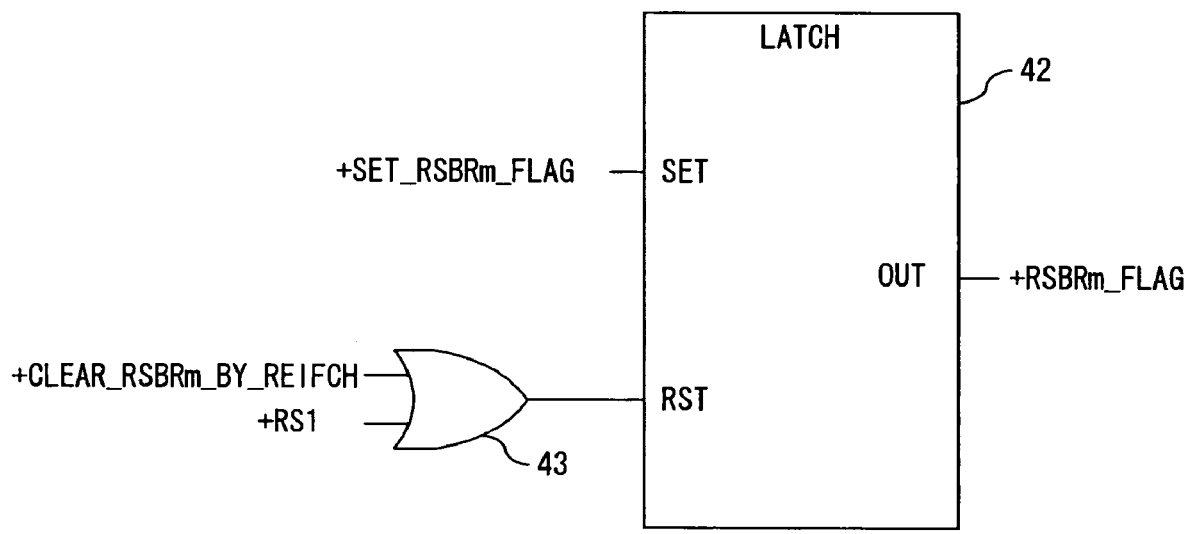
FIG. 14 shows the latch circuit in each entry.

FIG. 14 shows the latch circuit of each entry corresponding to the latch circuit in prior art shown in FIG. 5. The output of the OR gate 36 shown in FIG. 13 is given to the set terminal of the latch 42, and the output of the OR gate 43 is given to the reset terminal. When either a CLEAR signal indicating that the release of RSBRm becomes necessary due to re-instruction fetching or RS1 as a RESET signal unrelated to this embodiment, for example, interrupt is inputted as H, the OR gate 43 outputs H to the set terminal.

In this embodiment, when an entry is released, the movement of the contents of the entry, namely bubbling-up is carried out without seeing the contents of the VALID flag when it is determined that bubbling-up should be carried out as described in FIG. 13 instead of conducting bubbling-up after a VALID flag corresponding to the entry lowers. The resetting corresponding to the COMPLETE signal reset in the latch circuit (FIG. 5) corresponding to the entries from RSBR0 (top entry) to RSBR2 (third entry) which are likely to be released in the prior art shown in FIG. 1 is not carried out in this embodiment, but the exact same latch circuit as in FIG. 14 is used for the entries from RSBR0 (top entry) to RSBRn (last entry). Even if the contents of the flag of, for example, RSBR (m+1) as the output of the AND gate 38 are given to the set terminal of the latch 42 as the output of, for example, the OR gate 36 shown in FIG. 13, it is in the next cycle that the contents of the flag are actually stored in the latch 42.

Figure 15:
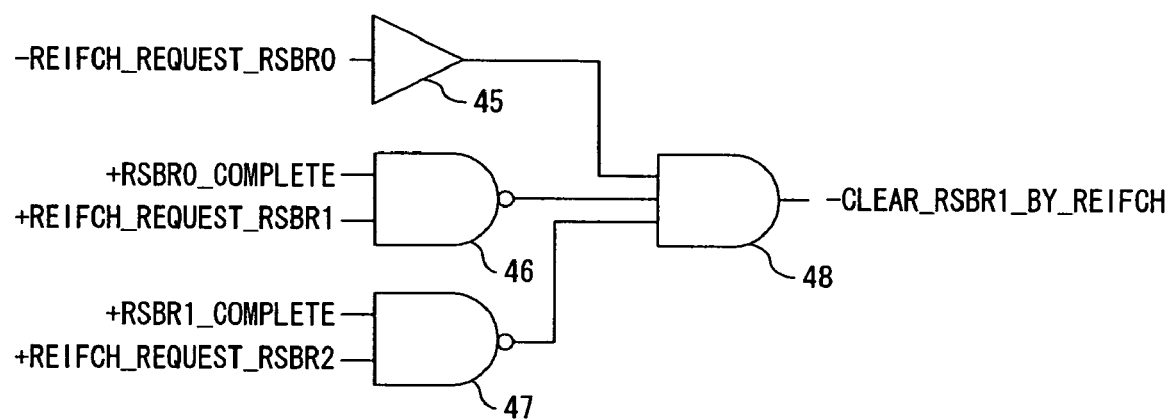
FIG. 15 shows the entry CLEAR signal output circuit (No. 1) in accordance with re-instruction fetching.
Figure 16:
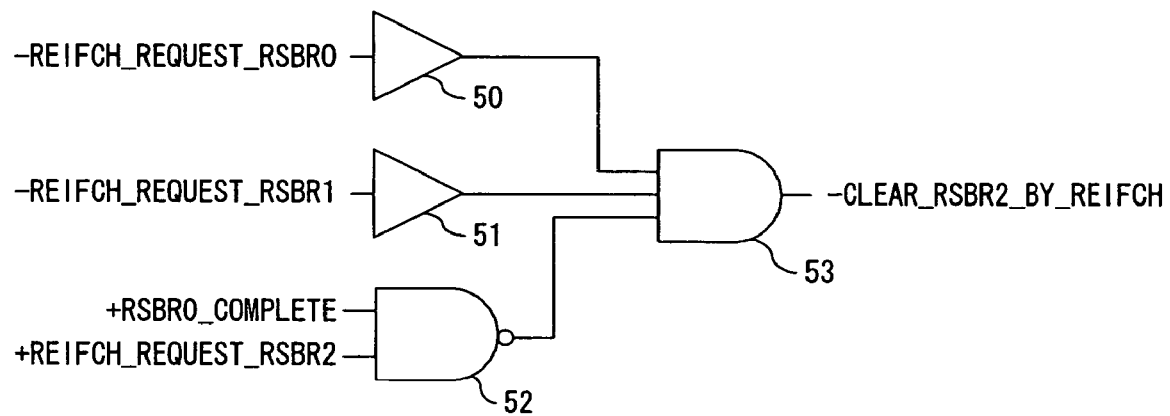
FIG. 16 shows the entry CLEAR signal output circuit (No. 2) in accordance with re-instruction fetching.
Figure 17:
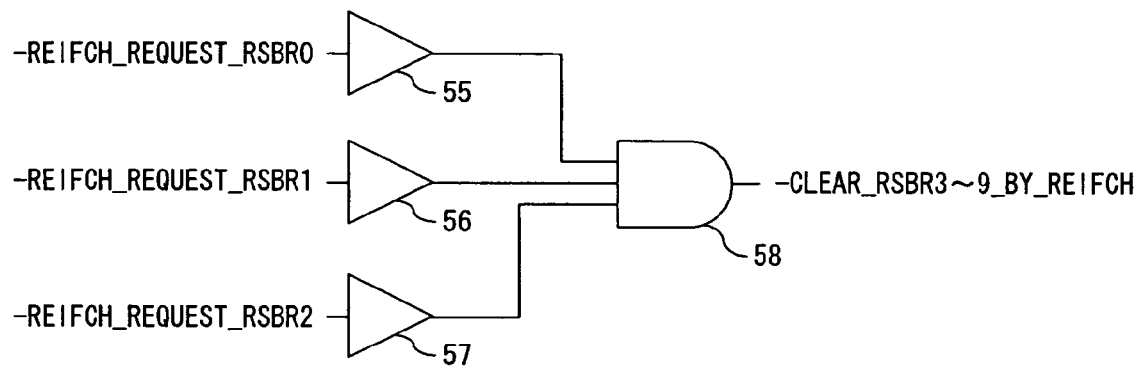
FIG. 17 shows the entry CLEAR signal output circuit (No. 3) in accordance with re-instruction fetching.

Each of FIG. 15 to FIG. 17 shows the CLEAR signal output circuit which outputs a CLEAR signal for the corresponding entry when the prediction for the branch instruction fails and re-instruction fetching is performed. In this embodiment, when the branch prediction ends in failure in the branch instruction corresponding to the third entry from the top entry within the branch reservation station 12 shown in FIG. 7, namely RSBR0, RSBR1 and RSBR2, the request of re-instruction fetching is supposed to be given to the instruction control unit 10 from the branch instruction corresponding to any of these entries. The circuits in FIG. 15 to FIG. 17 operate basically in negative logic.

FIG. 15 shows the CLEAR signal output circuit which resets the second entry RSBR1 from the top. In FIG. 15, when a signal indicating that the request of re-instruction fetching to the buffer 45 has been outputted from the branch instruction corresponding to RSBR0 is inputted as L; when a COMPLETE signal for the top entry RSBR0 and a signal indicating that the request of re-instruction fetching to the NAND gate 46 has been outputted from the branch instruction corresponding to the next entry RSBR2 are inputted as H; and when a COMPLETE signal for RSBR1 and a signal indicating that the request of re-instruction fetching to the NAND gate 47 has been outputted from the branch instruction corresponding to RSBR2 are inputted as H, a CLEAR signal for RSBR1 is outputted as L from the AND gate 48. Here, the input condition for the NAND gate 46 indicates that though the request of re-instruction fetching is outputted from the branch instruction responding to RSBR1, since the storage contents of RSBR1 are moved to RSBR0 by bubbling-up, RSBR1 should be reset. In the same way, the input condition for the NAND gate 47 indicates that since both RSBR0 and RSBR1 become empty, bubbling-up is conducted by the number of two entries, and the storage contents of RSBR2 are moved to RSBR0, RSBR1 should be reset.

FIG. 16 shows the CLEAR signal output circuit for RSBR2. In FIG. 16, a CLEAR signal for RSBR2 is outputted via the buffer 50 to which a signal indicating that the request of re-instruction fetching has been outputted from the branch instruction corresponding to RSBR0 is inputted as L; the buffer 51 to which a signal indicating that the request of re-instruction fetching has been outputted from the branch instruction corresponding to RSBR1 is inputted as L; the NAND gate 52 to which a COMPLETE signal for RSBR0 and a signal indicating that the request of re-instruction fetching has been outputted from the branch instruction corresponding to RSBR2 are inputted as H; and the AND gate 53. Here, the input condition for the NAND gate 52 indicates that since the top entry is released, bubbling-up is conducted by the number of one entry, and the storage contents of RSBR2 are moved to RSBR1, RSBR2 must be cleared.

FIG. 17 shows the CLEAR signal output circuit for the remaining entries, namely entries from RSBR3 to RSBRn (here, n=9). When a signal indicating that the request of re-instruction fetching has been outputted from the branch instruction corresponding to either RSBR0, RSBR1 or RSBR2 is inputted as L to the buffer 55, 56 and 57, the remaining entries, RSBR3 to RSBRn, must be released, and a CLEAR signal for these entries is outputted from the AND gate 58.

Any of the entry CLEAR signal output circuits shown in FIG. 15, FIG. 16 and FIG. 17 constitutes, when the branch prediction concerning the branch instructions corresponding to the entries in which data required for the implementation control of the branch instructions is stored ends in failure, and re-instruction fetching is conducted in the same cycle as in the movement of the contents of entries by the bubble-up mechanism, a unit for releasing the entries corresponding to all the branch instructions in which the order of decoding is newer than said branch instructions, namely an entry release unit when re-instruction fetching is conducted.

Figure 18:
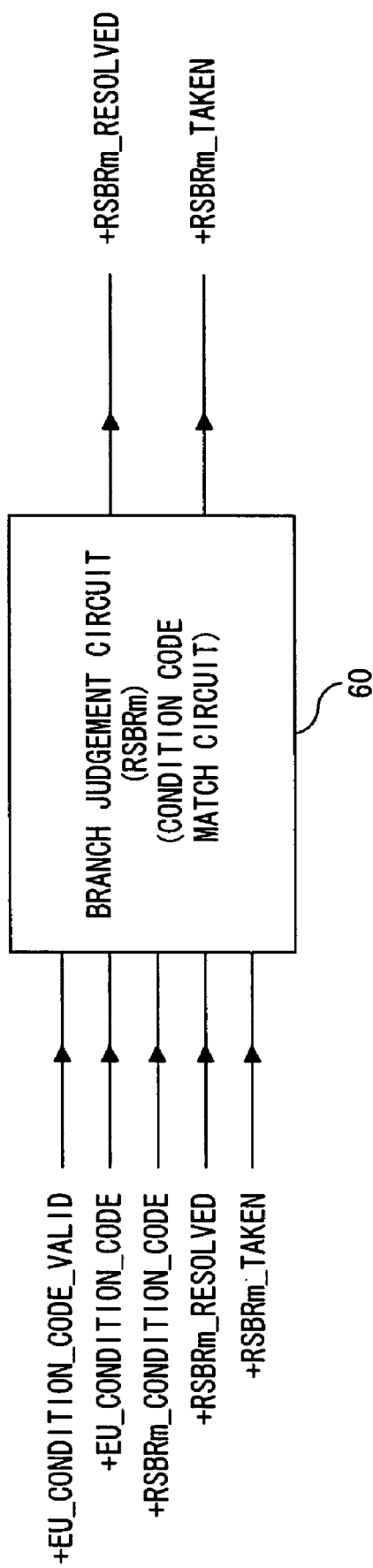
FIG. 18 shows the operation of the branch judgement circuit as part of the entry update circuit.
Figure 19:
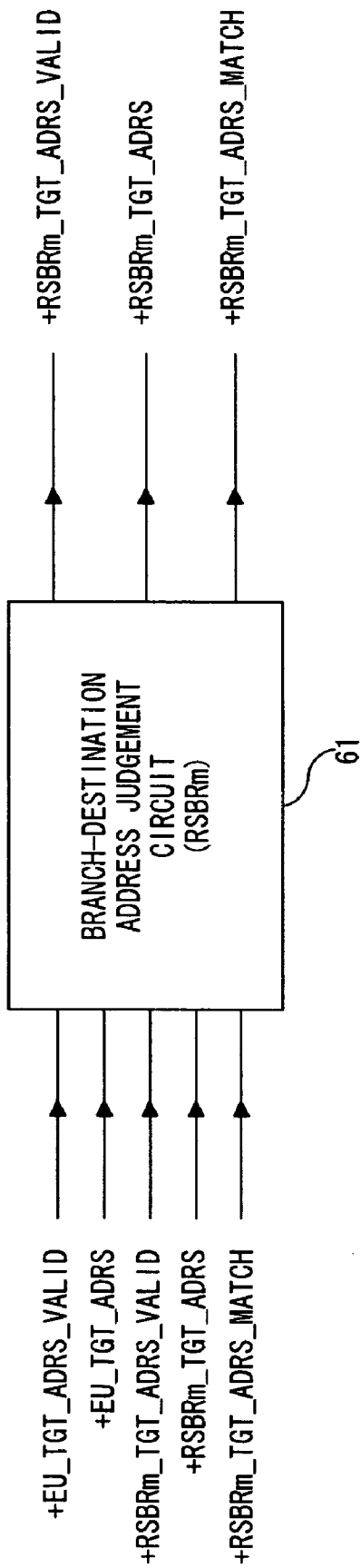
FIG. 19 shows the operation of the branch-destination address judgement circuit as part of the entry update circuit.

FIG. 18 and FIG. 19 show the branch judgement circuit and the branch-destination address judgement circuit as part of the update circuit corresponding to each entry described in FIG. 8. FIG. 18 shows the operation of the branch judgement circuit (condition code match circuit) for entry RSBRm. In FIG. 18, when an EU_CONDITION_CODE_VALID signal indicating that an operation in the operation circuit 13 shown in FIG. 7 has been completed, an EU_CONDITION_CODE signal as the result of the operation, a condition code in the OPC of the branch instruction entered to RSBRm, a RESOLVED signal which becomes 1 when branch judgement is completed, and a TAKEN signal which becomes 1 when the establishment of branch has been fixed are inputted to the branch judgment circuit 60, and when a RESOLVED signal indicating that the branch judgment is completed is 0, the branch judgment circuit 60 conducts the branch determination by matching the condition code given from the operation circuit 13 with the condition code entered, and when the RESOLVED signal is 1, the branch judgment circuit 60 carries out the operation of outputting two signals as they are.

An EU_TGT_ADRS_VALID signal indicating that the calculation of the branch-destination address in the operation circuit 13 has been completed, an EU_TGT_ADRS signal indicating the result of the address calculation of the branch destination, a TGT_ADRS_VALID signal which becomes 1 when the calculation of the branch-destination address of the branch instruction stored in RSBRm is completed, a TGT_ADRS signal indicating the branch-destination address when this VALID signal is 1, and the branch prediction address when this VALID signal is 0, and a TGT_ADRS_MATCH signal indicating that the branch prediction address is correct when this VALID signal is 1, are inputted to the branch-destination address judgement circuit 61, and for these signals inputted, when the VALID signal is 0, the branch-destination address judgment circuit 61 secures the branch-destination address and judges whether the branch prediction destination is correct, and when the VALID signal is 1, the branch-destination address judgment circuit 61 carries out the operation of outputting three signals as they are.

The circuits shown in FIG. 18 and FIG. 19 exist between, for example, the OR gate shown in FIG. 13 and the set terminal of the latch circuit 42 shown in FIG. 14, and are used to update part of flags and data. The flags and data which are updated by the update circuit 22 corresponding to each entry shown in FIG. 8 correspond to the above-mentioned RESOLVED signal, TAKEN signal, TGT_ADRES_VALID signal, TGT_ADRS signal and TGT_ADRS_MATCH signal.

Figure 20:
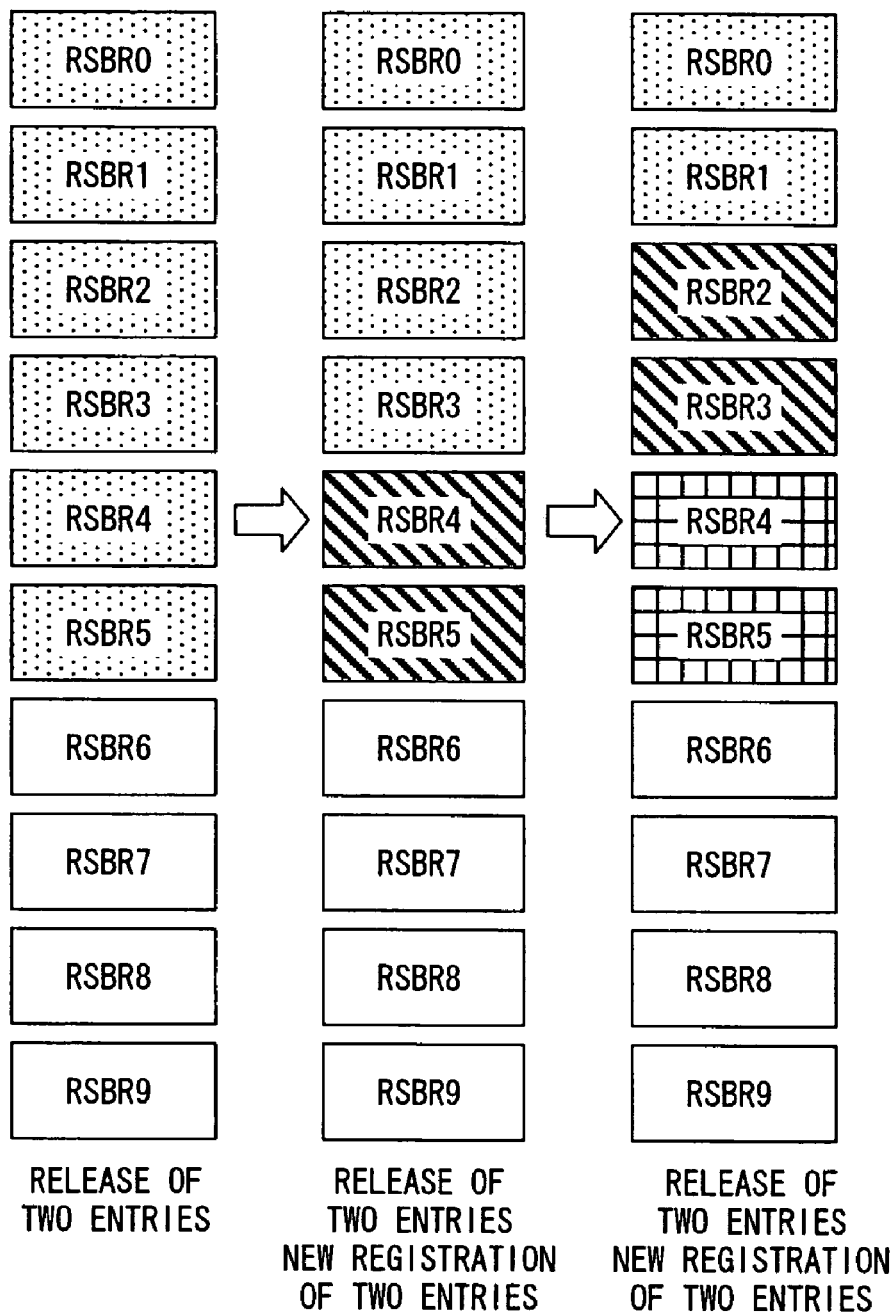
FIG. 20 shows the operation of the release of entries and the registration of new entries in the embodiment of the present invention.
Figure 21:
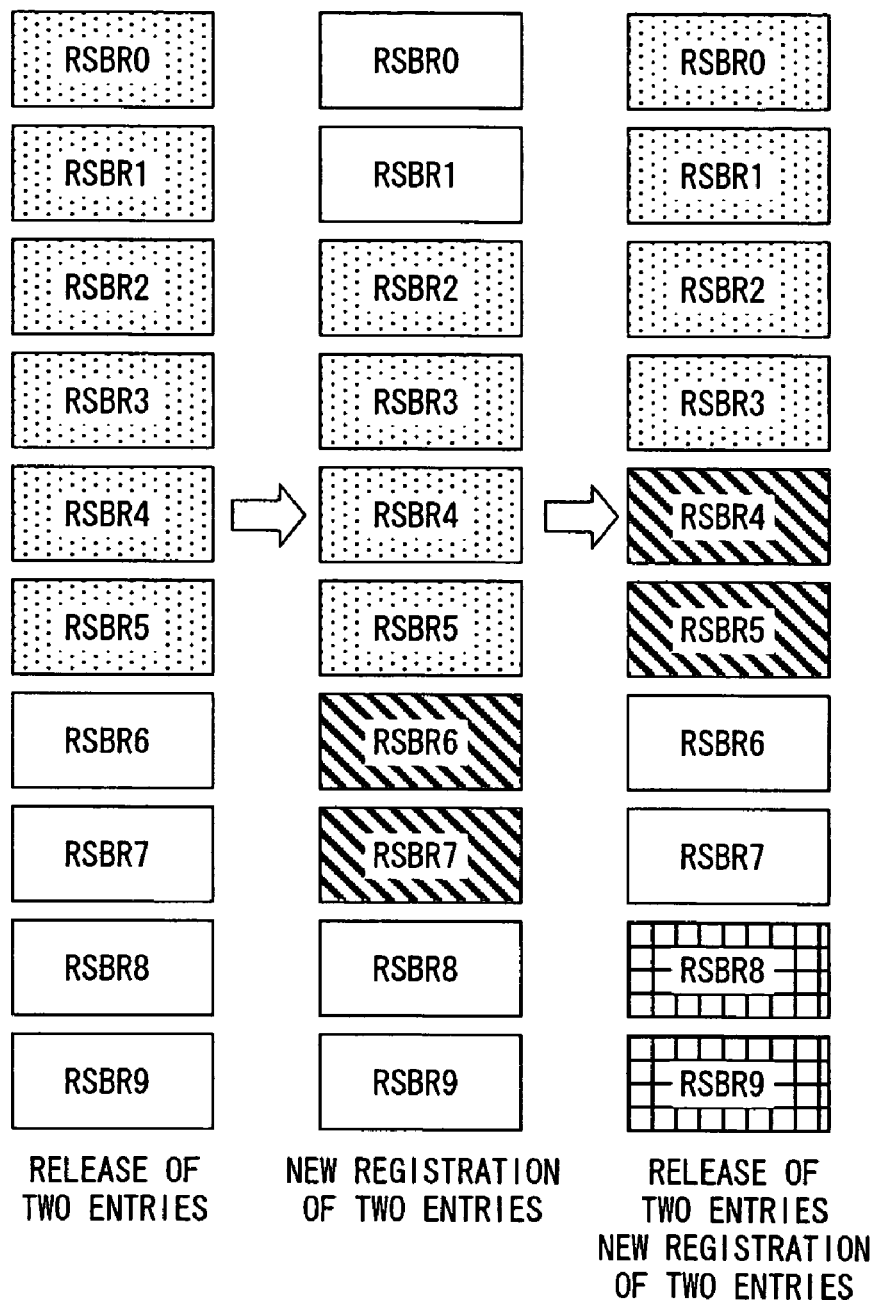
FIG. 21 is an example showing the operation for the release of entries and the registration of new entries in prior art to be compared with FIG. 20.

Finally, the release of entries and the operation of new registration of entries in both the embodiment of the present invention and the prior art are compared using FIG. 20 and FIG. 21 assuming that the number of simultaneous release as two entries, the number of simultaneous new registration as two entries and the number of moved entries in bubbling-up as two entries.

FIG. 20 shows the operation of release of entries and the registration of new entries in the embodiment of the present invention. In the first cycle, data is stored in six entries from RSBR0 to RSBR5 among ten entries. It is supposed that the implementation control of the branch instructions corresponding to the top two entries RSBR0 and RSBR1 has been completed, and the release of these two entries has become possible, and the data corresponding to the two new branch instructions is going to be stored in the two entries RSBR6 and RSBR7 from the side of the decoder.

In the next cycle, the storage contents of the entries from RSBR2 to RSBR5 are bubbled-up in a direction toward the top entry by the number of two entries and are moved to RSBR0 to RSBR3, and at the same time the data which was going to be stored in RSBR6 and RSBR7 in the preceding cycle is also bubbled-up and is registered to RSBR4 and RSBR5 as two new entries. At the same time, it is supposed that in this cycle, the completion of the branch instructions corresponding to the two top entries, RSBR0 and RSBR1, has become possible, and data corresponding to two new instructions is going to be stored in RSBR6 and RSBR7 from the side of the decoder. As a result, bubbling-up is conducted by the number of two entries in the next cycle, and the storage contents of the entries from RSBR2 to RSBR5 are moved in a direction toward the top entry by the number of two entries, and data responding to the new branch instructions is stored in RSBR4 and RSBR5 as new registration entries.

In FIG. 21 which shows the operation in prior art, the state in the first cycle is the same as in FIG. 20, but in the next cycle, bubbling-up is not conducted; RSBR0 and RSBR1 become empty; the VALID flags for these entries are lowered; and new entries are registered in RSBR6 and RSBR7. In the next cycle, bubbling-up is conducted by the number of two entries; data of the entries from RSBR2 to RSBR7 is moved to RSBR0 to RSBR5 respectively; but data of newly registered entries is not bubbled up at the same time; the new entries are made as RSBR8 and RSBR9; RSBR6 and RSBR7 are empty and become toothless; since data is stored up to the last entry, RSBR9, the making of new entries for new branch instructions after then becomes impossible.

What is claimed is:

1. A branch instruction control apparatus in which a plurality of entries in which data required for the implementation control of branch instructions and a valid flag for the data are stored in order of decoding successively from the top entry are provided, comprising:
a bubble-up mechanism which, when one or more entries are successively released in order of older decoding from the top entry among the entries whose implementation control of the corresponding branch instructions has been completed, moves the contents of the remaining entries in a direction toward the top entry by the number of entries released regardless of a value of the valid flag of the released entries, and
a new-entry data set unit for storing data required for the implementation control of newly decoded branch instructions in one or more empty entries which are near the top entry including the entries which become empty by the movement, in the same cycle as in the movement of the said contents of entries by the bubble-up mechanism.

2. The branch instruction control apparatus according to claim 1, further comprising:
an entry data update unit for updating the data required for the implementation control of the branch instruction stored in each entry in the same cycle as in the movement of the entry contents by the bubble-up mechanism.

3. The branch instruction control apparatus according to claim 1, further comprising:
an entry release unit for releasing the entries corresponding to all new branch instructions in which the order of decoding is newer than the branch instructions when the branch prediction concerning the branch instructions corresponding to the entries in which data required for the implementation control of the branch instructions is stored ends in failure and re-instruction fetching is conducted in the same cycle as in the movement of the contents of entries by the bubble-up mechanism.

4. The branch instruction control apparatus according to claim 1, wherein
the number of entries to be released and the number of new entries in which data is newly stored are equal.

5. A branch instruction control apparatus which has a plurality of entries in which data required for the implementation control of the branch instructions and a valid flag for the data are stored in order of decoding of the branch instructions successively from the top entry, wherein
said apparatus comprises:
a bubble-up mechanism which, when one or more entries are successively released in order of older decoding from the top entry among the entries whose implementation control for the branch instructions has been completed, moves the contents of the remaining entries in a direction toward the top entry by the number of entries released regardless of a value of the valid flag of the released entries;
a new-entry data set unit for storing data required for the implementation control of newly decoded branch instructions in one or more empty entries which are near the top entry including the entries which become empty by the movement, in the same cycle as in the movement of the said contents of entries by the bubble-up mechanism;
an entry data update unit for updating the data required for the implementation control of branch instructions stored in each entry in the same cycle as in the movement of the contents of entries by the bubble-up mechanism; and
an entry release unit for releasing the entries corresponding to new branch instructions in which the order of decoding is newer than the branch instructions when the branch prediction concerning the branch instructions corresponding to the entries in which data required for the implementation control of branch instructions is stored ends in failure and re-instructions are fetched, in the same cycle as in the movement of the contents of entries by the bubble-up mechanism.

6. A branch instruction control method for controlling branch instructions using a plurality of entries in which data required for the implementation control of branch instructions and a valid flag for the data are stored in order of decoding successively from the top entry, wherein when one or more entries are successively released in order of older decoding from the top entry among the entries whose implementation control of the corresponding branch instructions has been completed, the contents of the remaining entries are moved in a direction toward the top entry by the number of entries released by a bubble-up mechanism regardless of a value of the valid flag of the released entries; and data required for the implementation control of newly decoded branch instructions is stored in one or more empty entries which are near the top entry including the entries which become empty by the movement, in the same cycle as in the movement of the said contents.

7. The branch instruction control method according to claim 6, wherein data required for the implementation control of the branch instructions stored in each entry is updated in the same cycle as in the movement of the entry contents by the bubble-up mechanism.

8. The branch instruction control method according to claim 6, wherein the entries corresponding to all new branch instructions in which the order of decoding is newer than the branch instructions are released when the branch prediction concerning the branch instructions corresponding to the entries in which data required for the implementation control of the branch instructions is stored ends in failure and re-instruction fetching is conducted in the same cycle as in the movement of the contents of entries by the bubble-up mechanism.

9. The branch instruction control method according to claim 6, wherein the number of entries to be released and the number of new entries in which data is newly stored are equal.

10. A branch instruction control method for controlling branch instructions using a plurality of entries in which data required for the implementation control of branch instructions and a valid flag for the data are stored in order of decoding successively from the top entry, wherein when one or more entries are successively released in order of older decoding from the top entry among the entries whose implementation control of the corresponding branch instructions has been completed, the contents of the remaining entries are moved in a direction toward the top entry by the number of entries released by a bubble-up mechanism;

data required for the implementation control of newly decoded branch instructions is stored in one or more empty entries which are near the top entry including the entries which become empty by the movement, in the same cycle as in the movement of the said contents of entries by the bubble-up mechanism regardless of a value of the valid flag of the released entries;

the data required for the implementation control of branch instructions stored in each entry is updated in the same cycle as in the movement of the contents of entries by the bubble-up mechanism; and the entries corresponding to all new branch instructions in which the order of decoding is newer than the branch instructions are released when the branch prediction concerning the branch instructions corresponding to the entries in which data required for the implementation control of the branch instructions is stored ends in failure and re-instructions are fetched, in the same cycle as in the movement of the contents of entries by the bubble-up mechanism.

* * * * *